United States Patent [19]

Shimomura et al.

[11] Patent Number: 4,822,469
[45] Date of Patent: Apr. 18, 1989

[54] ELECTRICAL POWER SUPPLY FOR AN ELECTROLYTIC GAS GENERATOR

[75] Inventors: Mitsuzo Shimomura; Yoshiro Torii, both of Minami, Japan

[73] Assignee: Stec Inc., Kyoto, Japan

[21] Appl. No.: 155,534

[22] Filed: Feb. 12, 1988

[30] Foreign Application Priority Data

Mar. 8, 1987 [JP] Japan .......................... 62-33736[U]

[51] Int. Cl.4 .......................... C25B 15/02; C25B 9/04
[52] U.S. Cl. .................................... 204/230; 204/278
[58] Field of Search ............... 204/230, 278, 270, 129, 204/DIG. 9

[56] References Cited

U.S. PATENT DOCUMENTS

| | | | |
|---|---|---|---|
| 3,336,215 | 8/1967 | Hagen | 204/230 |
| 3,448,035 | 6/1969 | Serfass | 204/278 |
| 3,485,742 | 12/1969 | Emich et al. | 204/230 |
| 3,489,670 | 12/1969 | Maget | 204/129 |
| 3,755,128 | 8/1973 | Herwig | 204/230 |
| 3,870,616 | 3/1975 | Dempsey et al. | 204/230 |
| 4,078,985 | 3/1978 | Takeuchi | 204/230 |
| 4,113,601 | 9/1978 | Spirig | 204/230 |

Primary Examiner—Donald R. Valentine
Attorney, Agent, or Firm—Wenderoth, Lind & Ponack

[57] ABSTRACT

An electrical power supply for an electrolytic gas generator includes an input network provided with a first rectifying-flattening circuit for generating a DC voltage from an AC power source voltage input thereto and an output network provided with a switching circuit for generating a pulse voltage having a predetermined frequency from the DC voltage supplied from the input network and a second rectifying-flattening circuit for transforming the pulse voltage into the DC voltage and for supplying this DC voltage to an electrode of the electrolytic cell. The power supply further includes a voltage-adjusting circuit for generating an error signal corresponding to the difference between a feedback signal for any one of a signal corresponding to the output voltage from the output network and a signal corresponding to a detected pressure of the gas generated within the electrolytic cell and a standard signal corresponding to a design pressure of the gas generated so as to maintain the output value of the output network or the pressure of the gas generated at a predetermined design value and further includes a frequency-fixed pulse-width modulator for generating a pulse-signal having a predetermined frequency modulated to a pulse-width corresponding to the error signal and a driver circuit for generating a drive pulse for controlling the switching of the switching circuit in the output network in accordance with the modulated pulse signal from the modulator.

1 Claim, 6 Drawing Sheets

ELECTRICAL POWER SUPPLY FOR AN ELECTROLYTIC GAS GENERATOR

BACKGROUND OF THE INVENTION

The present invention relates to an electrolytic gas generator (for generating, for example—hydrogen gas) which is frequency used as a source of a carrier gas in gas chromatography, a source of fuel gas for an analyzer using a flame ion detector (FID) or a flame photometric detector (FPD) and the like, a source of gas for use in physical and chemical laboratories and the like; that is to say, a supply source of a relative small and constant quantity of gas. More particularly, the present invention relates to an improve cell voltage controller in an electrolytic gas generator comprising:

an electrolytic cell for passing a predetermined electrolyte therethrough and provided with an electrode for electrolyzing the electrolyte so as to generate a desired gas therein and a gas passage communicatingly connected therewith for taking out the generated desired gas and an electrical power supply for supplying the electrode in the electrolytic cell with electrical power for use in the electrolysis.

The basic construction of an electrolytic gas generator of this type is shown in U.S. Pat. Nos. 3,489,670 and 3,448,035, for example.

In addition, a basic voltage-controller construction, such as providing an electrical power-controller, which carries out a feedback control for a supply current on the basis of a signal corresponding to the supply current itself so that the electrical power (in this case, the current has an important meaning since electrolysis is used) for use in the electrolysis and supplied to the electrode of the electrolytic cell may be held at a predetermined design value, or providing an electrical power-controller, which carries out a feedback control for the supply current on the basis of a signal corresponding to a pressure detected by a gas pressure sensor provided in the gas passage for taking out the generated gas so that the pressure of the gas generated by the electrolytic cell may be held at a predetermined design value, is shown in U.S. Pat. No. 3,485,742, for example.

However, with an electrolytic gas generator of this kind, since it is used in specialized fields as a supply source of a relatively small and constant quantity of gas, it must be capable of stably controlling its output of gas. Accordingly, an important problem is how the control of the electrical power is precisely and stably carried out whether the feedback control for the electrical current supplied to the electrode in the above described electrolytic cell is carried out on the basis of a signal corresponding to the supply current itself or is carried out on the basis of a signal corresponding to the detected pressure of the generated gas. Accordingly, various kinds of devices have been tried in order to solve such a problem.

A recent technique, which is noteworthy in this respect, has been proposed in U.S. Pat. No. 3,870,616.

That is, a conventional electrolytic (hydrogen) gas generator according to U.S. Pat. No. 3,870,616 has a construction as shown in FIGS. 6 and 7.

Figure 6:
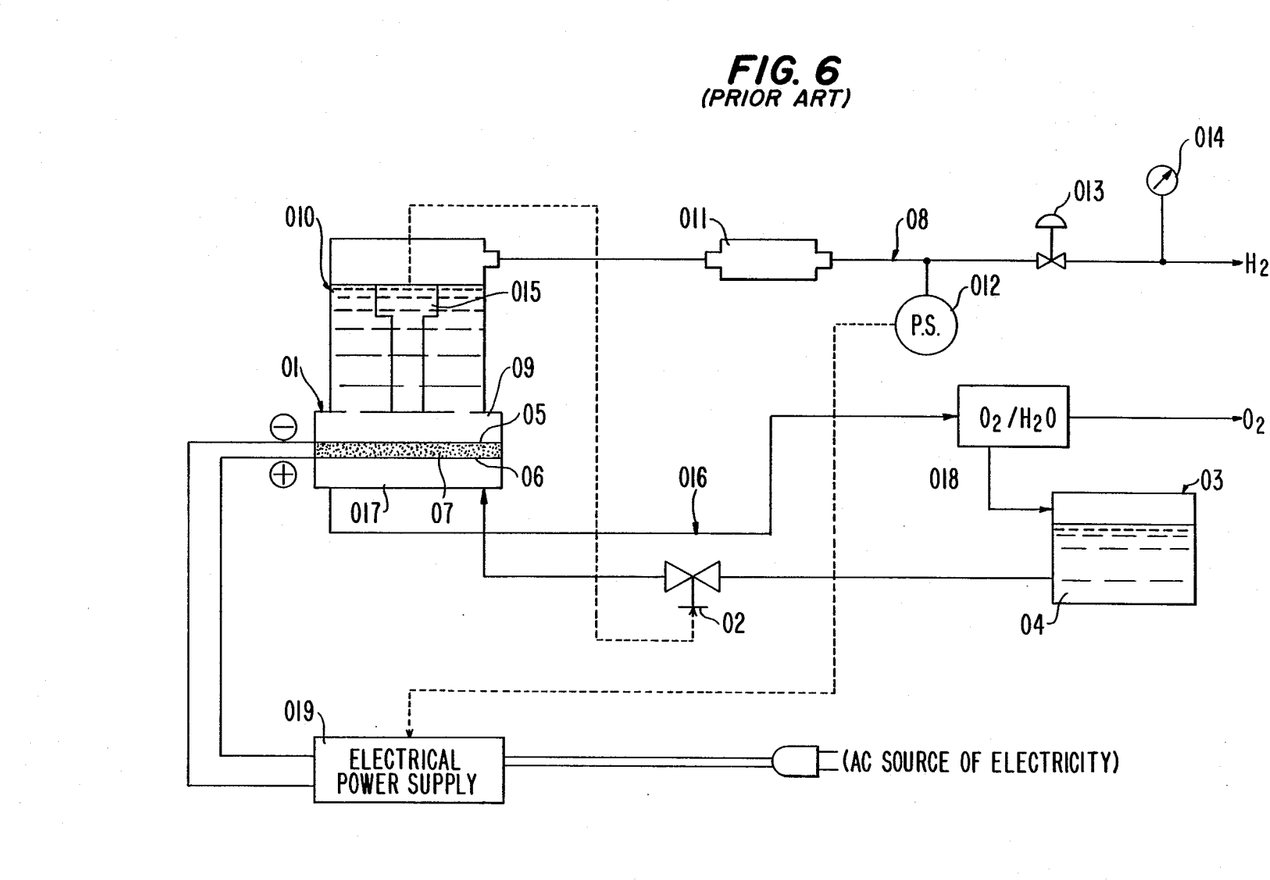
FIGS. 6 and 7 are block diagrams of a conventional gas generator.

Referring now to the block diagram illustrated in FIG. 6, reference numeral 01 designates an electrolytic cell for passing a predetermined electrolyte 04 (in this example, water: $H_2O$) supplied from an electrolytic tank 03 through an electromagnetic on-off valve 02 and provided with an electrode 05 (cathode) for electrolyzing water to evolve the desired gas, which is hydrogen gas, and an electrode (anode) 06 for evolving oxygen gas to be discharged therein so that an electrolytic membrane 07 may be held between the electrode 05 and the electrode 06. In addition, reference numeral 08 designates a hydrogen gas passage connected to the electrolytic cell 01 for taking out hydrogen gas evolved in the electrolytic cell 01 and comprising a hydrogen gas-separating trap 010 directly communicating with a liquid chamber 09 of the cathode 05 side in the electrolytic cell 01, a humidity-removing cylinder 011, a pressure switch 012 which turns ON when the gas pressure in the passage reaches at least a predetermined value, a pressure regulator 013, and a pressure gauge 014 arranged in this order. Reference numeral 015 designates a water level sensor for generating a signal when the water within the hydrogen gas-separating trap 010 reaches at least a predetermined water level so as to close the electromagnetic on-off valve 02, thereby stopping the supply of water from the electrolyte tank 03. In addition, reference number 016 designates an oxygen gas-discharging passage communicatingly connected to a liquid chamber 017 of the anode 06 side of the electrolytic cell 01 for taking out oxygen gas evolved in the electrolytic cell 01 and provided with an oxygen gas-separating trap 018 in the middle thereof. Water separated from the oxygen gas in the oxygen gas-separating trap 018 is returned to the electrolyte tank 03. Reference numeral 019 designates an electrical power supply for supplying the electrodes 05 and 06 in the electrolytic cell 01 with a current for use in the electrolysis and having an electrical power controller function for carrying out a feedback control for the supply current on the basis of the supply current itself so that the supply current to the electrodes 05 and 06 may be held at a predetermined design value and having an emergency controller function for lowering or stopping the supplying of electrical power to the electrodes 05 and 06 when the gas pressure within the hydrogen gas passage 08 reaches at least a predetermined value so as to turn ON the pressure switch 012, as described below in detail with reference to the block diagram of FIG. 7.

Figure 7:
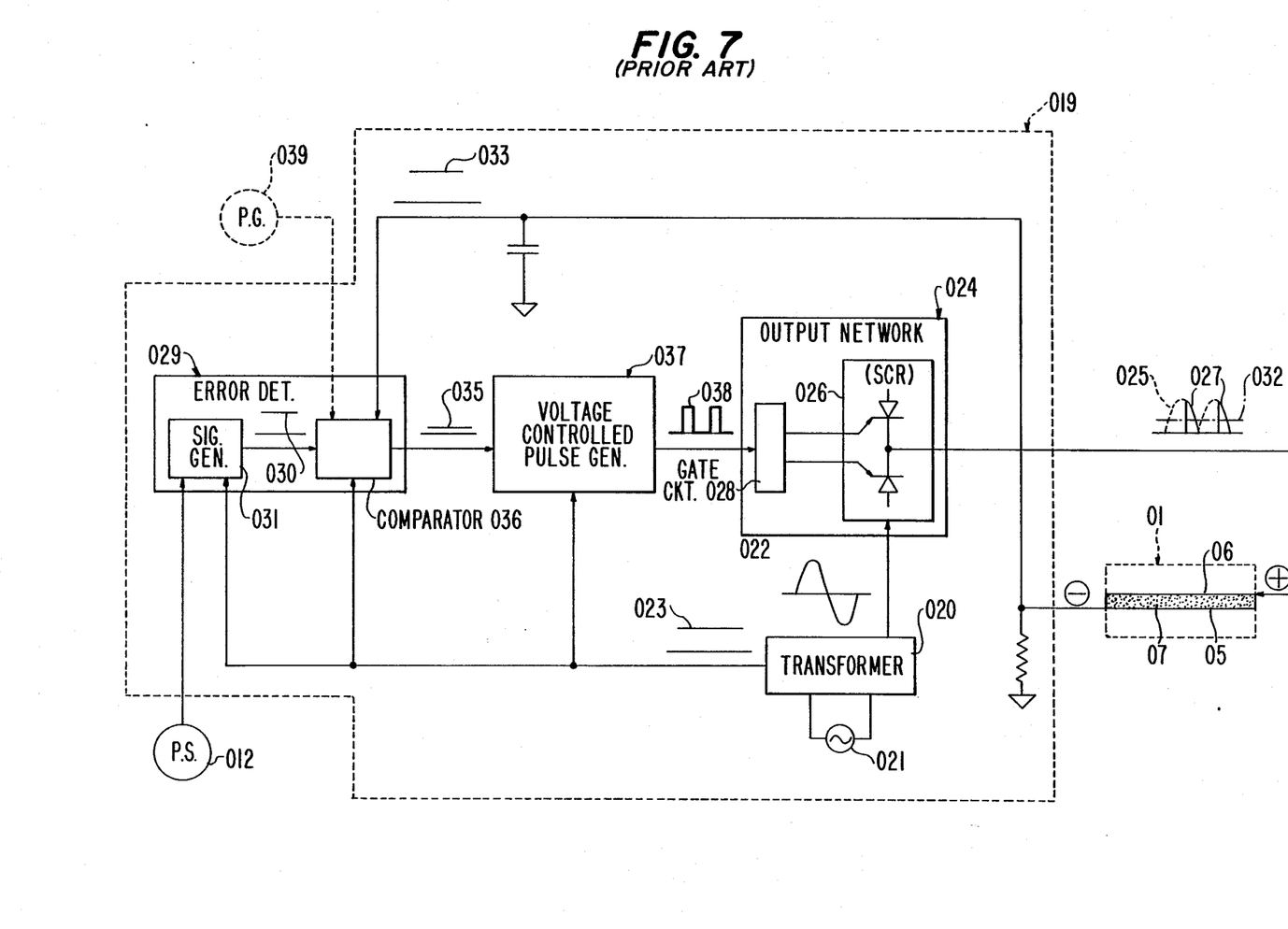

The electrical power supply 019 as shown in FIG. 7 comprises a power source transformer 020 for generating a transformed AC 022, which becomes the basis of the electrical power supplied to the electrodes 05 and 06 in the electrolytic cell 01 from an AC power source voltage 021 input thereto, and a DC control voltage 023 to be supplied to each of desired circuits for use in the control which will be discussed later.

In addition, reference numeral 024 designates an output network for generating the supply current for the electrodes 05 and 06 in the electrolytic cell 01 provided with an AC solid state switching device (hereinafter referred to as an SCR) 026 for converting the transformed AC voltage 022 supplied from the power source transformer 020 into a pulsating current 025 an a gate circuit 028 adapted to operate so as to output only a part (a partially switched-on divided pulsating current 027) of the pulsating current 025 generated by the SCR 026.

In addition, reference numeral 029 designates an error-detecting network provided with a basic signal-generating circuit 031 for generating a basic signal 030 corresponding to the predetermined design value from the DC voltage 023 supplied from the power source transformer 020 and a comparator circuit 036 for generating an error signal 035 corresponding to a difference between the basic signal 030 and a feedback signal 033 corresponding to an average current 032 output from the output network 024 and flowing the electrolytic cell 01. Reference numeral 037 designates a voltage controlled variable repetition frequency pulse generator for supplying a trigger pulse 038 to the gate circuit 028 in the output network 024 and adapted to output a trigger pulse 038 having a frequency corresponding to a magnitude of the error signal 035 supplied from the error detecting network 029.

In addition, the basic signal-generating circuit 031 in the error-detecting network 029 receives a detected signal from the pressure switch 012 provided in the hydrogen gas passage 08 as shown in FIG. 6 and adopts a safety-controlling construction such that the basic signal generated by the basic signal-generating circuit 031 is significantly lower than the original design value in the case where the gas pressure within the passage 08 reaches at least the predetermined value and the ON-signal from the pressure switch 012 is supplied to the basic signal-generating circuit 031, thereby lowering the supply current to the electrodes 05 and 06 in the electrolytic cell 01.

In addition, as described above, U.S. Pat. No. 3,870,616 also discloses that the feedback control for the supply current to the electrodes 05 and 06 can be carried out so as to hold the pressure of the gas generated by the electrolytic cell 01 at the predetermined design value not be feeding back the signal corresponding to the current supplied to the electrodes 05 and 06 in the electrolytic cell 01 to the comparison circuit 036 in the error-detecting network 029 and carrying out the feedback control for the supplying voltage on the basis of the supply current itself but by providing a pressure sensor 039 for detecting the gas pressure within the hydrogen gas passage 08 and feeding back a signal corresponding to the gas pressure detected by the pressure sensor 039 to the comparison circuit 036, as shown by a dotted line in FIG. 7.

In short, an electrolytic gas generator of this conventional construction is adapted to use the pulsating current 025 obtained by transforming the basically AC source voltage 021 and alternatively switching-over the transformed AC source voltage (as a result, the divided pulsating current 027 obtained by partially switching-on the pulsating current 025 by the gate) as the supplying voltage for the electrodes 05 and 06 in the electrolytic cell 01 and adopts a cell current-controller arranged such that the average current 032 supplied to the electrodes 05 and 06 is controlled so as to hold the average current 032 supplied to the electrodes 05 and 06 at a value corresponding to the design basic signal 030 by adjusting a gate-on quantity for the basic pulsating current 025 by the feedback control on the basis of the current signal corresponding to the average current 032 of the divided pulsating current 027, thereby making a relatively fine and highly responsive current control possible.

However, the electrolytic gas generator of the conventional construction has the following disadvantages:

(a) Since the pulsating current 025 having a frequency which is the same as that of the AC source voltage 021 is used as the voltage which becomes the basis of the current supplied to the electrodes 05 and 06 in the electrolytic cell 01, a large-sized and heavy transformer 020 (in this example, a power source transformer) is required:

(b) Since a peak current of the pulsating current 025 is higher (at least twice) in comparison with the average current 032 which is a substantial current supplied to the electrodes 05 and 06, various electrical constituent elements must have higher anti-current characteristics, whereby the electrical power supply 019 is apt to be large-sized and expensive as a whole coupled with the disadvantage (a);

(c) Since the construction, in which the divided pulsating current 027 is supplied to the electrodes 05 and 06 in the electrolytic cell 01, is adopted, the voltage-supplying state is apt to be fundamentally unstable;

(d) Since a control mode, in which the originally nonlinear pulsating current 025 is gated-on by a trigger pulse to obtain the divided pulsating current 027, is adopted, a linear feedback control is not carried out, thereby being apt to cause a hunting phenomenon; and (e) Since the construction, in which the divided pulsating current 027 having a peak current higher than the average current 032 is supplied to the electrodes 05 and 06 in the electrolytic cell 01, is adopted, the heat loss power of the electrolytic cell 01 becomes comparatively large, thereby increasing the loss of electrical power and significantly reducing the useful lifetime of the electrolytic cell 01 on account of a bad influence due to the consumption of the electrolytic membrane 07 and the like.

In addition, if said pulsating current 025 is approximately calculated provided that an internal resistance of the electrolytic cell 01 is $R_s$, the peak current of the pulsating current 027 being about $2i$ ($i$ is the average current 032), and the pulsating current 025 being a square pulse repeated at a period of about 2T, the loss of electrical power (corresponding to the heat loss power) in the electrolytic cell 01 is expressed by the following equation:

$$(2i)^2 \cdot R_s \cdot T/2T \approx 2i^2 R_s$$

SUMMARY OF THE INVENTION

The present invention was achieved with the aim of eliminating the disadvantages of an electrolytic gas generator having such a conventional construction.

In order to achieve the above described object, an electrolytic gas generator according to the present invention having the fundamental construction as described at the beginning is characterized by an electrical power supply which comprises:

an input network provided with a first rectifying flattening circuit for generating a direct current voltage from an AC power source voltage input thereto;

an output network provided with a switching circuit for generating a pulse voltage having a predetermined frequency from the DC voltage supplied from the input network and a second rectifying-flattening circuit for transforming the pulse voltage generated by the switching circuit into a DC voltage and for supplying the DC voltage generated by the second rectifying-flattening circuit to the electrode in the electrolytic cell as the voltage for use in electrolysis; and a voltage-adjusting network provided with a comparison circuit for generating an error signal corresponding to a difference between a feedback signal for any one of a signal corresponding to the output voltage from the output network and a signal corresponding to a detected pressure of the gas generated and a standard signal corresponding to a design pressure of the gas generated so as to maintain the output voltage of the output network or the pressure of the gas generated at a predetermined design value, a frequency-fixed pulse-width modulation circuit for generating a pulse signal having a predetermined frequency modulated to a pulse width corresponding to the error signal supplied from the comparison to the error signal supplied from the comparison circuit and a driving circuit for generating a drive pulse for controlling the switching of the switching circuit in the output network in accordance with the modulated pulse signal supplied from the frequency-fixed pulse-width modulation circuit.

The operations exhibited by such a characteristic construction are as follows:

That is to say, in the electrical power supply means in the electrolytic gas generator according to the present invention, as will be apparent from the description on the preferred embodiments which will be discussed later.

(A) Since a pulsating current having a frequency which is the same as that of the power source AC voltage is not used as in the conventional electrolytic gas generator but rather a current obtained by converting the AC source voltage into a DC voltage in the input network provided with the first rectifying-flattening circuit, converting the resulting DC voltage into an AC voltage once in the switching circuit and further converting the resulting AC voltage into a DC voltage again by the second rectifying-flattening circuit in the output network is used as the voltage which is the basis of the supplying current for the electrode in the electrolytic cell, the transformer required in the circuits can be very small-sized and significantly reduced in weight;

(B) Since the divided pulsating current is not used as in the conventional electrolytic gas generator but a DC current generated by the second rectifying-flattening circuit in the output network is used also as the current to be finally supplied to the electrode in the electrolytic cell, no peak current higher than the average current is supplied to the electrode. Accordingly, various electrical constituent elements having a relatively small anti-current characteristic can be used, whereby the electrical power supply and consequently, the apparatus can be very small-sized and significantly reduced in cost as a whole coupled with the above described advantage (A);

(C) Since the divided pulsating current is not used as in the conventional electrolytic gas generator but the flattened DC current is fed to the electrode in the electrolytic cell, the current supply state can be stabilized;

(D) Since the pulse voltage, which becomes the basis for generating the supply current to the electrode in the electrolytic cell, is not obtained by gating-on the originally nonlinear pulse voltage by the trigger pulse as in the conventional electrolytic gas generator but is obtained by dividing the DC voltage obtained by the input network by the switching circuit actuated by the drive pulse supplied from the frequency-fixed pulse width modulation circuit in the voltage-controlled network, a stabilized feedback control which is superior in linearity to that in the conventional electrolytic gas generator can be achieved;

(E) Since, as described above, a DC current having no peak current higher than the average current is used as the current to be finally supplied to the electrode in the electrolytic cell, the loss of electrical power and the heat loss power in the electrolytic cell can be significantly reduced in comparison with those of the conventional electrolytic gas generator, thereby prolonging the useful lifetime of the electrolytic cell. In addition, it is apparent from the calculation of the internal resistance $R_s$ of the electrolytic cell from the supply current i (i is an average voltage, too) to the electrode in the electrolytic cell that the loss of the electrical power (corresponding to the heat loss power) becomes $i^2 R_s$ which is about $\frac{1}{2}$ times that (about $2i^2 R_s$) of the conventional electrolytic gas generator.

Thus, according to the present invention, an electrolytic gas generator can be provided which is capable of significantly reducing an electrical power supply in size, reducing its cost, prolonging the useful lifetime of the apparatus, saving energy, and very accurately, with a good response and stably controlling the supply current to an electrode in an electrolytic cell.

BRIEF DESCRIPTION OF THE DRAWINGS

The preferred embodiments of the present invention will be below described with reference to the drawings in which:

FIGS. 1 to 4 show a hydrogen gas generator which is one example of an electrolytic gas generator according to the present invention.

DESCRIPTION OF THE PREFERRED EMBODIMENT

Figure 1:
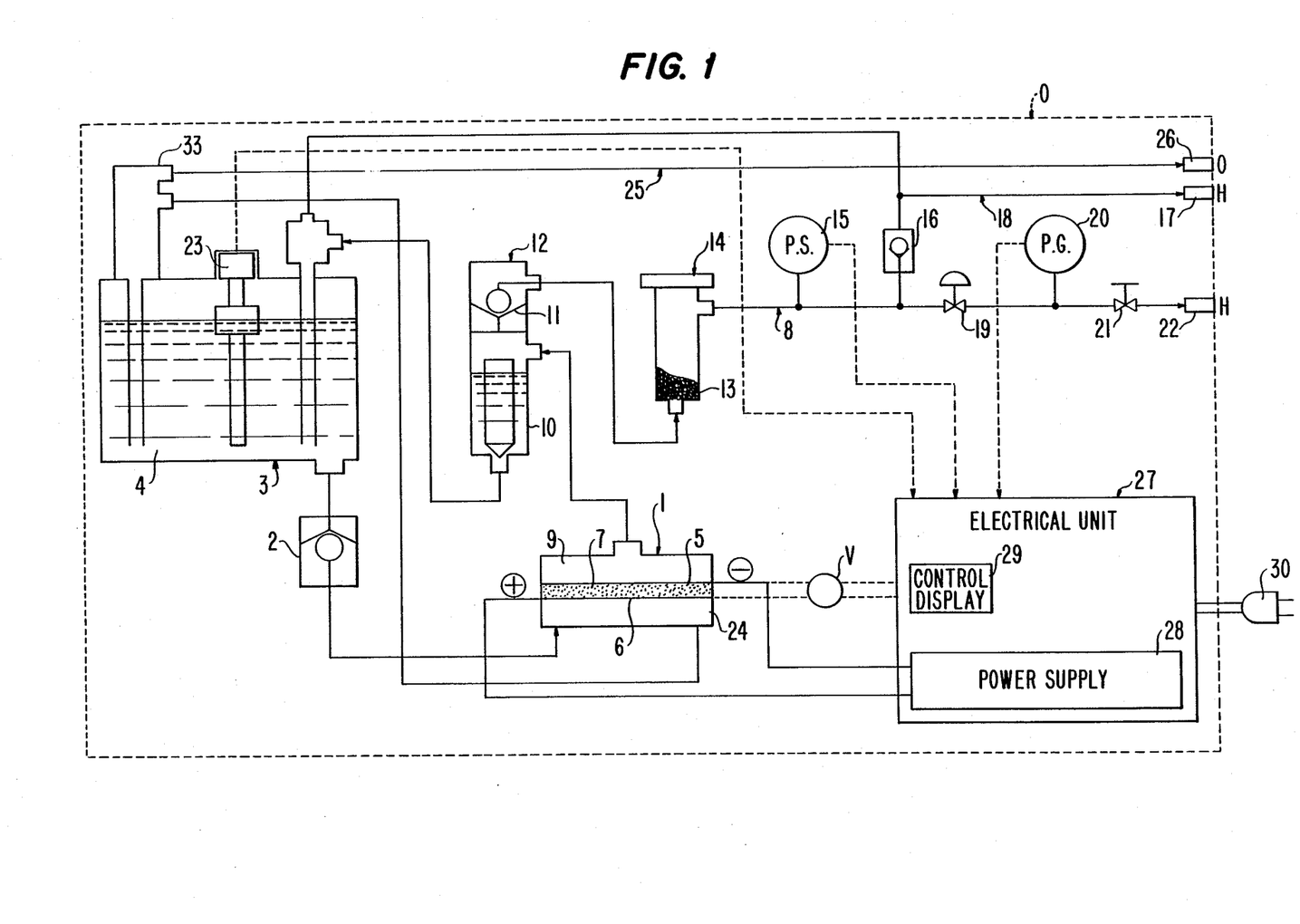
FIG. 1 is a general block diagram of a first embodiment of a gas generator in accordance with the present invention.

Referring now to FIG. 1, which is a general block diagram, reference numeral 0 designates a compact bench type casing provided with the following constituent elements contained therein.

Reference numeral 1 designates an electrolytic cell for passing a predetermined electrolyte 4 (in this preferred embodiment-pure water: $H_2O$) supplied from an electrolyte tank 3 through a stop valve 2 and provided with an electrode (cathode) 5 for evolving hydrogen gas ($H_2$), which is the desired gas, by the electrolysis of water and an electrode (anode) 6 for evolving oxygen gas ($O_2$), which is a gas to be discharged so that a very simply maintainable solid high molecular electrolytic membrane 7 may be held between the electrode 5 and the electrode 6. In addition, V designates a voltage sensor for detecting a voltage applied between electrode 6 and electrode 6. Reference numeral 8 designates a hydrogen gas passage connected to the electrolytic cell 1 for taking out hydrogen gas evolved in the electrolytic cell 1. The hydrogen gas passage 8 is communicatingly connected to a liquid chamber 9 of a side of the cathode 5 in the electrolytic cell 1 and the electrolyte tank 3 and provided with a hydrogen gas trap 12 comprising a float needle valve 10 for automatically controlling a water level (since this feature has been proposed by the present application in Japanese Utility Model Application No. 164750/1986, a detailed description of the construction and operation thereof has been omitted for the sake of brevity) and a stop valve 11, a dehumidifying cylinder 14 with dehumidifying agents 13 such as silica gel contained therein, a pressure switch 15 which is turned ON when the pressure of gases in the passage is raised to at least a predetermined value, a branched passage 18 provided with a safety valve 16 which opens when the pressure of gases in the passage is raised to a dangerous pressure and a hydrogen gas exhaust port 17, a pressure-regulating valve 19, a pressure sensor 20 for detecting a pressure of gases in the passage 8, an on-off valve 21, and a hydrogen gas-taking out port 22 arranged in this order. In addition, reference numeral 23 designates a water level sensor for emitting an alarm signal indicating the necessity of replenishing the electrolyte (pure water) when the water level in the electrolyte tank 3 becomes less than a predetermined value. In addition, the electrolyte the electrolyte tank 3 is also provided with an oxygen gas trap 33 for taking out oxygen gas evolved in the electrolytic cell 1. Accordingly, an oxygen gas-exhausting passage 25, which is also communicatingly connected to a liquid chamber 24 of a side of the anode 6 in the electrolytic cell 1 and simultaneously provided with an oxygen gas-exhausting port 26, extends from the electrolytic cell 1.

Reference numeral 27 designates an electrical unit provided with an electrical power supply 28 for applying a voltage for use in electrolysis to the electrodes 5 and 6 in the electrolytic cell 1 and a control display 29 for digitally displaying: the value of the voltage applied to the electrodes 5 and 6 in the electrolytic cell 1, the value of the pressure of gases in the hydrogen gas-introducing passage 8, a cell-abnormality alarm, an electrolyte level-abnormality alarm and the like on the basis of input signals from the voltage sensor V, the pressure switch 15, the pressure sensor 20 and the water level sensor 23. Reference numeral 30 designates a power source connector for a commercial alternating current power source (50 to 60 Hz).

The construction of the electrical power supply 28 according to the present invention will be described in detail below with reference to the block diagram of FIG. 2, the more detailed diagram of FIG. 3, and the waveform diagram of FIG. 4.

The electrical power supply 28 is provided with an electrical power controlling function for carrying out a feedback control for the supply current on the basis of the supply current itself so as to maintain the supply current to the electrodes 5 and 6 in the electrolytic cell 1 at the design value and an emergency control function for immediately cutting off the supply current to the electrodes 5 and 6 when the pressure of gases in the hydrogen gas-introducing passage 8 is raised to at least a predetermined value.

Figure 2:
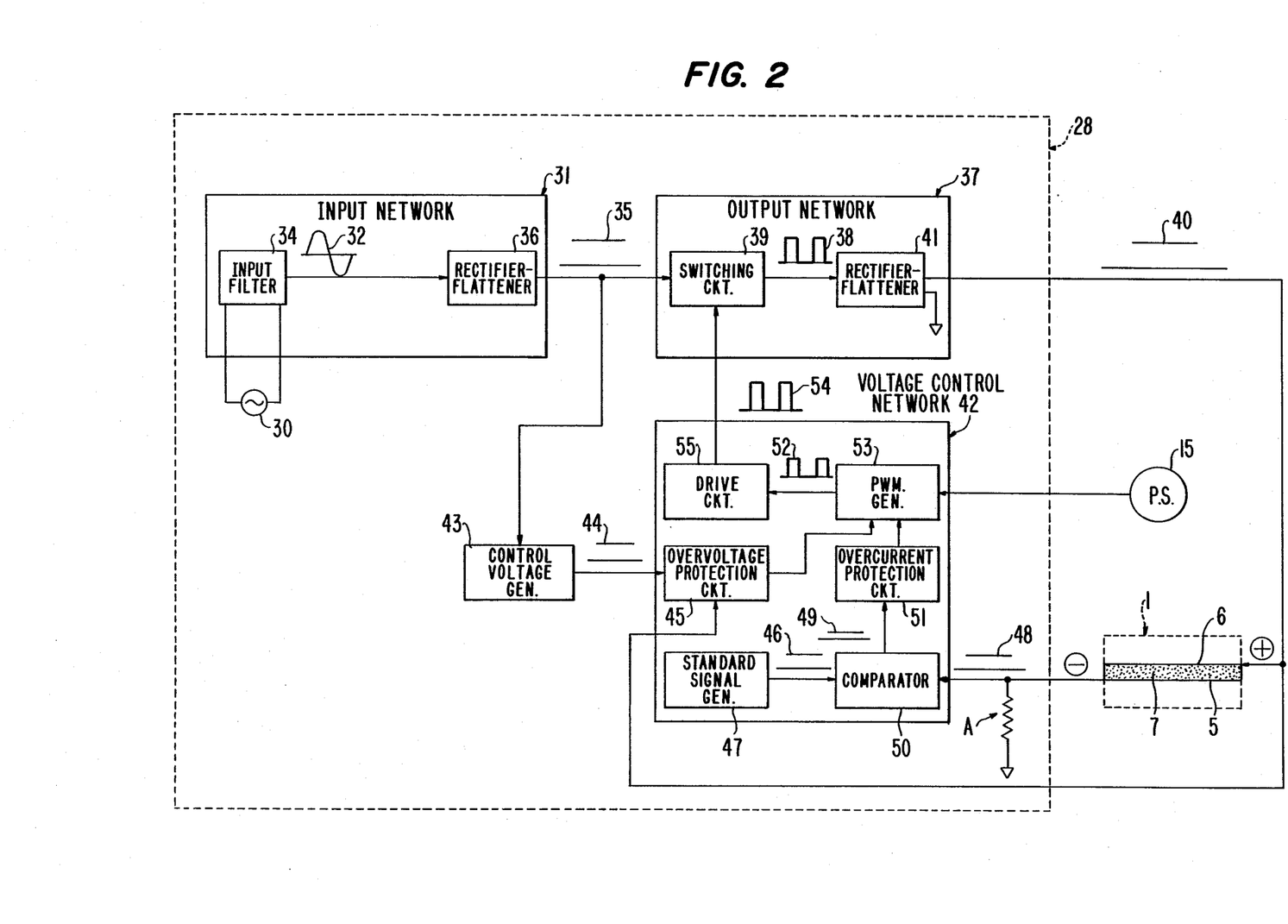
FIG. 2 is a block diagram of the power supply 28 of FIG. 1.

That is to say, in the electrical power supply 28 as shown in FIG. 2, reference numeral 31 designates an input network provided with an input filter 34, in which an AC power source voltage for the commercial AC power source (50 to 60 Hz) 30 is input, and a first rectifier-flattener circuit for rectifying and flattening an AC voltage 32, which has passed through the filter 34, so as to generate a DC voltage 35.

Furthermore, reference numeral 37 designates an output network provided with a high-frequency switching circuit 39 (well known as a forward type in general) for generating a pulse voltage 38 having a predetermined frequency from the DC voltage 35 supplied by the input network 31 and a second rectifier-flattener circuit 41 for rectifying an flattening the pulse voltage 38 generated by the switching circuit 39 to convert the pulse voltage 38 into a DC current 40 and adapted to supply the electrodes 5 and 6 in the electrolytic cell 1 with the DC current 40 generated by the second rectifier-flattener circuit 41 as a current for use in the electrolysis.

Reference numeral 42 designates a voltage control network for carrying out a control of maintaining the output current 40 from the output network 37 at the design value and simultaneously carrying out an emergency control of immediately cutting off the supply current to the electrodes 5 and 6 when the pressure of gases in the hydrogen gas passage 8 is raised to at least a predetermined value so as to turn ON the pressure switch 15. In addition, reference numeral 43 designates a control voltage-generator circuit for generating a predetermined operation voltage 44 of the voltage control network 42 from a DC voltage 35 supplied by the input network 31 and adapted to supply each of the constituent elements in the voltage control network 42 with the output voltage 44 from this control voltage-generator circuit 43.

The voltage control network 42 comprises a standard signal-generator circuit 47 for generating a standard signal 46 corresponding to the design current, a comparator circuit 50 for generating an error signal 49 corresponding to a difference between a feedback signal 48 of a signal (generated by an electrical current-detector means A) corresponding to the electrical current 40 output from the output network 37 and supplied to the electrodes 5 and 6 and the standard signal 46 corresponding to the design value, a fixed frequency pulse-width modulation generator circuit ("PWM": Pulse Width Modulation circuit) 53 for generating a pulse signal 52 having a predetermined frequency modulated to a pulse width depending upon the error signal 49 supplied from the comparison circuit 50 through an overcurrent protection circuit 51 and a drive circuit 55 for generating a drive pulse for controlling the switching operation of the switching circuit 39 in the output network 37 depending upon the modulated pulse signal 52 supplied from the frequency-fixed pulse width modulation circuit 53.

In addition, referring to FIG. 2, reference numeral 45 designates an over-voltage protection circuit adapted to emit a signal for stopping an operation (i.e.—output) of said PWM circuit 53 when the voltage of said electrolytic cell 1 is at an excessive value (critical value), whereby the destruction of the electrolytic cell 1 due to excessive heating and the like can be prevented. Also said overcurrent protection circuit 51 is an element provided for the same object and is adapted to cut off the supply of an error signal 49 to the PWM circuit 53 when the current of the error signal 49 supplied from said comparison circuit 50 is at an excessive value.

In short, in the voltage control mechanism the DC voltage 35 generated in the input network 31 is used as a voltage, which becomes a basis of the supplying voltage to the electrodes 5 and 6 in the electrolytic cell 1, and the DC current 40 generated in the output network 37 is also the final supply current to the electrodes 5 and 6 and furthermore, the control of the magnitude of the DC current 40 supplied to the electrodes 5 and 6 is carried out by switching-on and off (dividing) the DC voltage 35 obtained by the input network 31 by means of the drive pulse 54 generated so as to have the pulse width depend upon the magnitude of the error signal 49 and then rectifying as well as flattening the resulting divided DC voltage.

In addition, the signal from the pressure switch 15 provided in the hydrogen gas-introducing passage 8 is input to the frequency-fixed pulse modulation circuit 53 so that the pulse signal 52 is not output at all when the pressure of gases in the hydrogen gas passage 8 is raised to at least a predetermined value, thereby supplying the ON-signal from the pressure switch 15. Accordingly, in that case, the supply current to the electrodes 5 and 6 is immediately cut off. In addition, it goes without saying that although the signal from the pressure switch 15 is used as the switching (gating) signal for stopping the operation of the frequency-fixed pulse width modulation circuit 53 in this preferred embodiment, a similar object can also be achieved in the event that the signal from the pressure switch 15 is fed to constituent elements, (such as the drive circuit 55), other than the pulse width modulation circuit 53.

Figure 3:
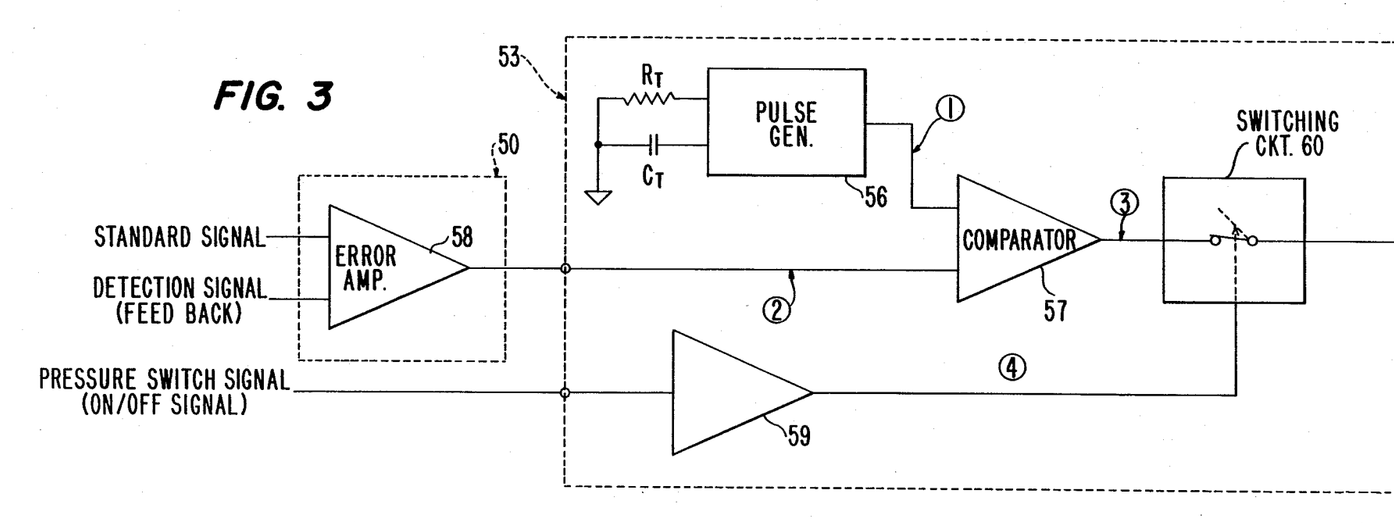
FIG. 3 is a more detailed block diagram of principal portions of the power supply 28 of FIG. 2.
Figure 4:
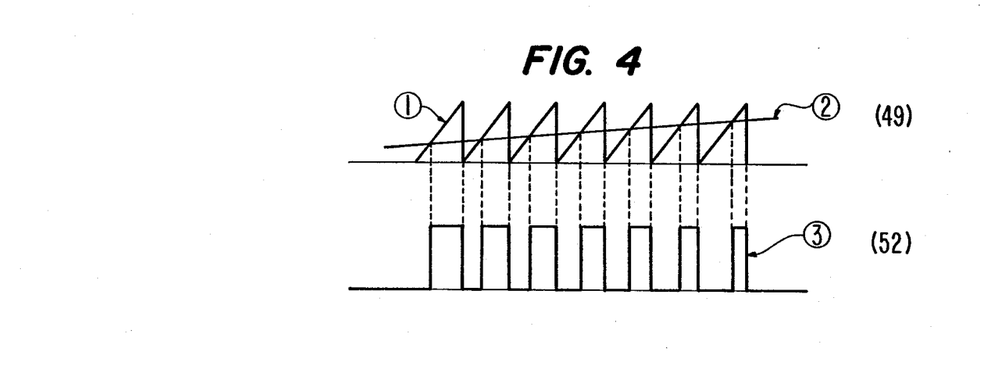
FIG. 4 is a waveform diagram of signals at three points in FIG. 3.

FIGS. 3 and 4 show examples of the detailed circuit construction and operation of the pulse width modulation (PWM) circuit 53. Referring to FIG. 3, reference numeral 56 designates a fixed frequency pulse generator for generating a saw-tooth shaped signal 1 having a predetermined frequency (refer to FIG. 4) determined by the fixed resistance $T_T$ and the capacitor $C_T$, the pulse signal 1 being input to the following pulse width modulation circuit 57 comprising a voltage comparator. An error signal 2 (refer to FIG. 4: this is same as the signal 49 in FIG. 2) output from an error amplifier 58 in the comparison circuit 50 is input to this pulse width modulation circuit 57. The pulse width modulation circuit 57 outputs a signal only when the saw-tooth shaped signal 1 is larger than the error signal 2, thereby outputting a pulse signal (in short, a pulse signal having a smaller width with an increase of the error signal 2) modulated in pulse width on the basis of the error signal 2, as shown by 3 in FIG. 4 (this is same as the signal 52 in the FIG. 2).

On the other hand, reference numeral 59 designates an amplifier for amplifying an ON/OFF signal from the pressure switch, whose output signal 4 is supplied to a switching (gating) circuit 60 provided in an output stage of the pulse width modulation circuit 57, and this switching (gating) circuit 60 is switched over so as to pass the modulated pulse signal 3 from the pulse width modulation circuit 57 therethrough as is when the signal 4 is switched OFF but immediately cuts off the modulated pulse signal 3 when the signal 4 is switched-ON.

Figure 5:
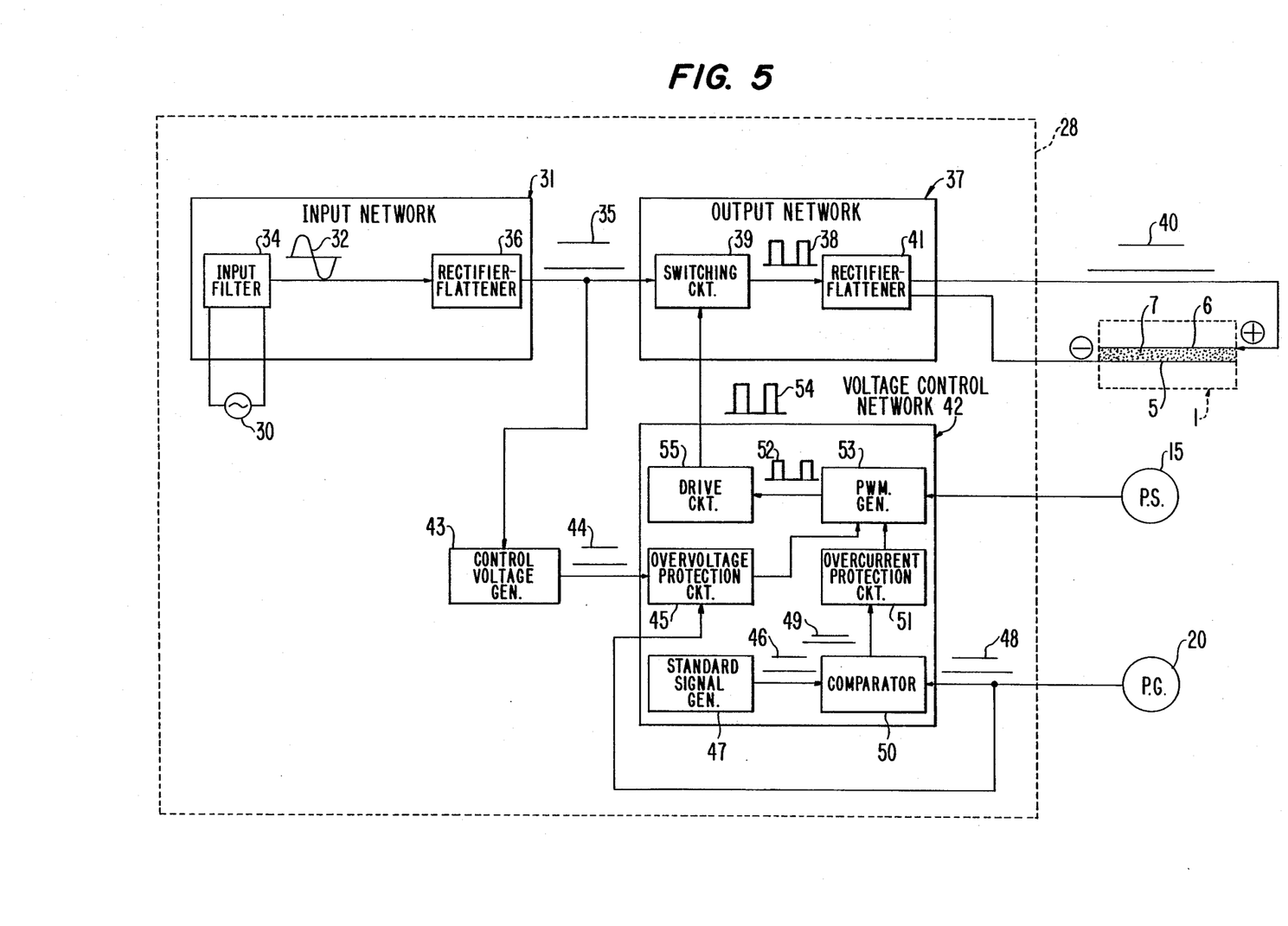
FIG. 5 is a general block diagram of a second embodiment of a gas generator in accordance with the present invention.

FIG. 5 is a block circuit diagram showing the electrical power supply 28 in the electrolytic gas generator according to the second preferred embodiment. The standard signal-generating circuit 47 in the voltage control network 42 is adapted to generate the standard signal corresponding to the design gas pressure. The pressure detection signal by the pressure sensor 20 provided in the hydrogen gas-introducing passage 8 is input to the comparator circuit 50 in place of feeding back the signal corresponding to the electrical current 40 supplied to the electrodes 5 and 6 as in the first preferred embodiment, whereby the supply current to the electrodes 5 and 6 in the electrolytic cell 1 is controlled so that the pressure of hydrogen gas introduced from the hydrogen gas passage 8 may be maintained at the design value. Since other constituent elements are basically the same as in the first preferred embodiment of FIG. 1, the elements having the same functions are marked with the same reference numerals.

As is apparent from the above detailed description, according to an electrolytic gas generator of the present invention, very superior effects are exhibited in that the electrical power supply can be very small-sized, and the apparatus significantly reduced in cost, and the useful lifetime of the apparatus is increased, and energy is saved, and the control of the voltage applied to electrodes in the electrolytic cell is very accurately and stably provided with a good response.

What is claimed is:

1. In an electrolytic gas generator comprising: an electrolytic cell having a predetermined electrolyte passing therethrough and provided with an electrode for electrolyzing the electrolyte so as to generate the desired gas therein and having a gas passage communicatingly connected therewith for outputting said generated gas, the improvement consisting of an electrical power supply for supplying the electrode in said electrolytic cell with electrical power for use in an electrolysis, said electrical power supply comprising:

an input network provided with a first rectifying flattening means for generating a D.C. voltage from an A.C. power source voltage input thereto;

an output network provided with a switching means for generating a pulse voltage having a predetermined frequency from said D.C. voltage supplied from said input network and a second rectifying-flattening means for transforming said pulse voltage generated by said switching means into said D.C. voltage and for supplying said D.C. voltage generated by said second rectifying-flattening means to said electrode in said electrolytic cell as the voltage for use in electrolysis;

a voltage-adjusting means having a comparison means for generating an error signal corresponding to a difference between a feedback signal for any one of a signal corresponding to the output voltage from said output network and a signal corresponding to a detected pressure of said gas generated and a standard signal corresponding to a design pressure of said gas generated so as to maintain the output value of said output network or the pressure of said gas generated at a predetermined design value; and a frequency-fixed pulse-width modulation means for generating a pulse signal having a predetermined frequency modulated to a pulse-width corresponding to the error signal supplied from said comparison means and a driving means for generating a drive pulse for controlling the switching of said switching means in said output network in accordance with said modulated pulse signal supplied from the frequency-fixed pulse-width modulation means.

* * * * *